(12) United States Patent
Iwasawa

(10) Patent No.: US 7,760,336 B2
(45) Date of Patent: Jul. 20, 2010

(54) LASER AREA SENSOR

(75) Inventor: Masashi Iwasawa, Otsu (JP)

(73) Assignee: Optex Co., Ltd., Shiga (JP)

( * ) Notice: Subject to any disclaimer, the term of this patent is extended or adjusted under 35 U.S.C. 154(b) by 121 days.

(21) Appl. No.: 12/289,245

(22) Filed: Oct. 23, 2008

(65) Prior Publication Data

US 2009/0109421 A1 Apr. 30, 2009

(30) Foreign Application Priority Data

Oct. 26, 2007 (JP) .............................. 2007-278957

(51) Int. Cl.
*G01C 3/08* (2006.01)
(52) U.S. Cl. ...................... 356/5.01; 356/4.01; 356/4.07
(58) Field of Classification Search ................ 356/4.01, 356/4.07, 5.01
See application file for complete search history.

(56) References Cited

U.S. PATENT DOCUMENTS

| | | | | |
|---|---|---|---|---|
| 6,819,407 | B2* | 11/2004 | Arita et al. | 356/4.01 |
| 6,956,227 | B2* | 10/2005 | Miyazaki et al. | 250/559.38 |
| 7,471,376 | B2* | 12/2008 | Bamji et al. | 356/5.01 |
| 7,515,256 | B2* | 4/2009 | Ohtomo et al. | 356/141.1 |
| 2004/0145722 | A1* | 7/2004 | Uomori et al. | 356/4.01 |

FOREIGN PATENT DOCUMENTS

| | | |
|---|---|---|
| JP | 3011121 | 12/1999 |
| JP | 2004-185363 | 7/2004 |

* cited by examiner

*Primary Examiner*—Isam Alsomiri
(74) *Attorney, Agent, or Firm*—Wenderoth, Lind & Ponack, L.L.P.

(57) ABSTRACT

One embodiment includes: A laser range finder that obtains a distance to an object and a light-reception level of reflected light: a scanning mechanism that changes the measurement direction; a data acquiring portion that periodically performs measurement while changing the measurement direction; a data correcting portion that removes distance information of a portion corresponding to a discontinuous change and corrects light-reception level information of a portion that does not correspond to the discontinuous change after the obtained distance information and light-reception level information are compared with distance information and light-reception level information of preceding and succeeding measurement periods in each direction; a human body judging portion that extracts a portion that is presumed to correspond to a human body, and judges whether or not the extracted portion matches a human body based on a time-series moving status of the extracted portion; and an alert output control portion.

20 Claims, 6 Drawing Sheets

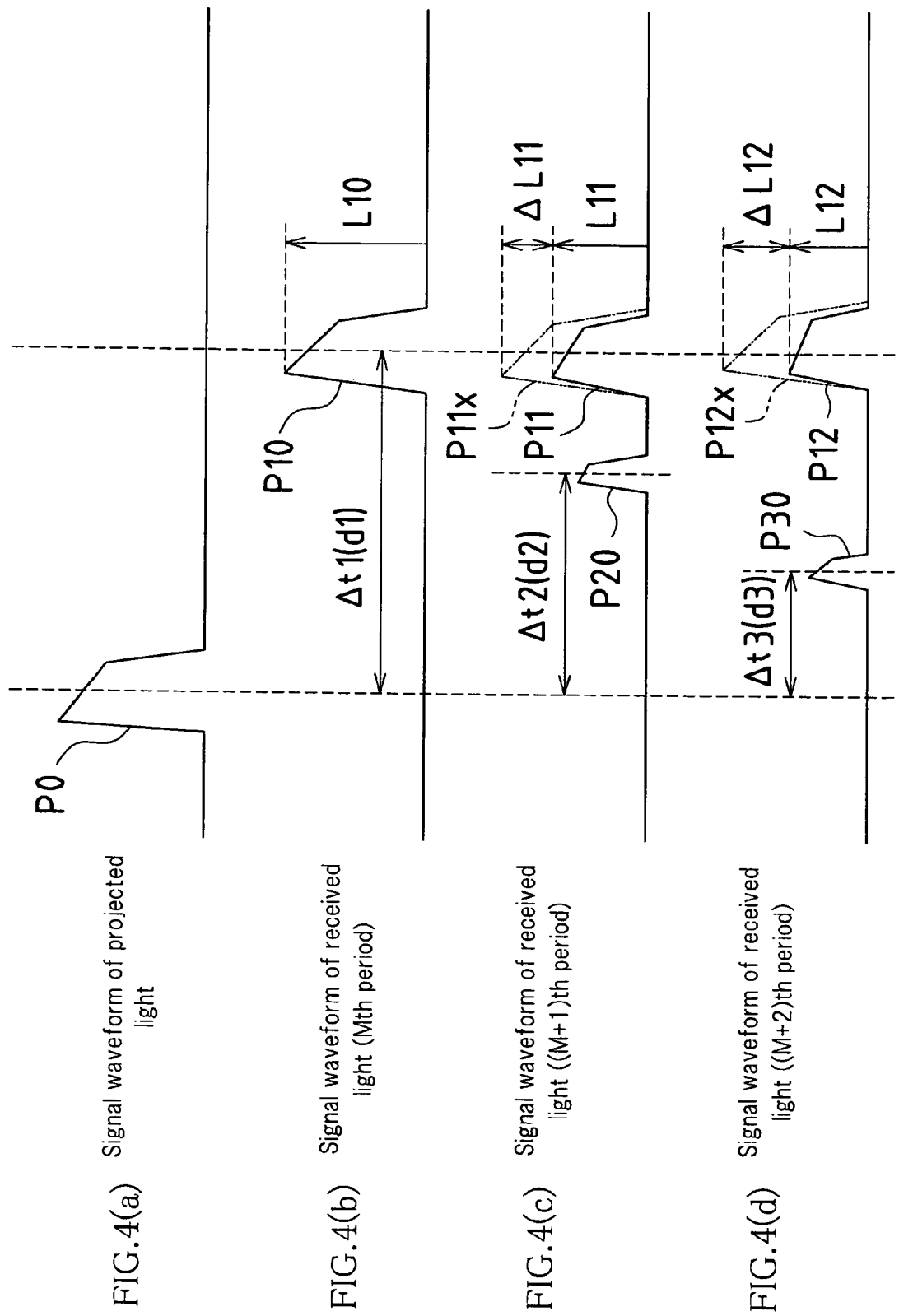

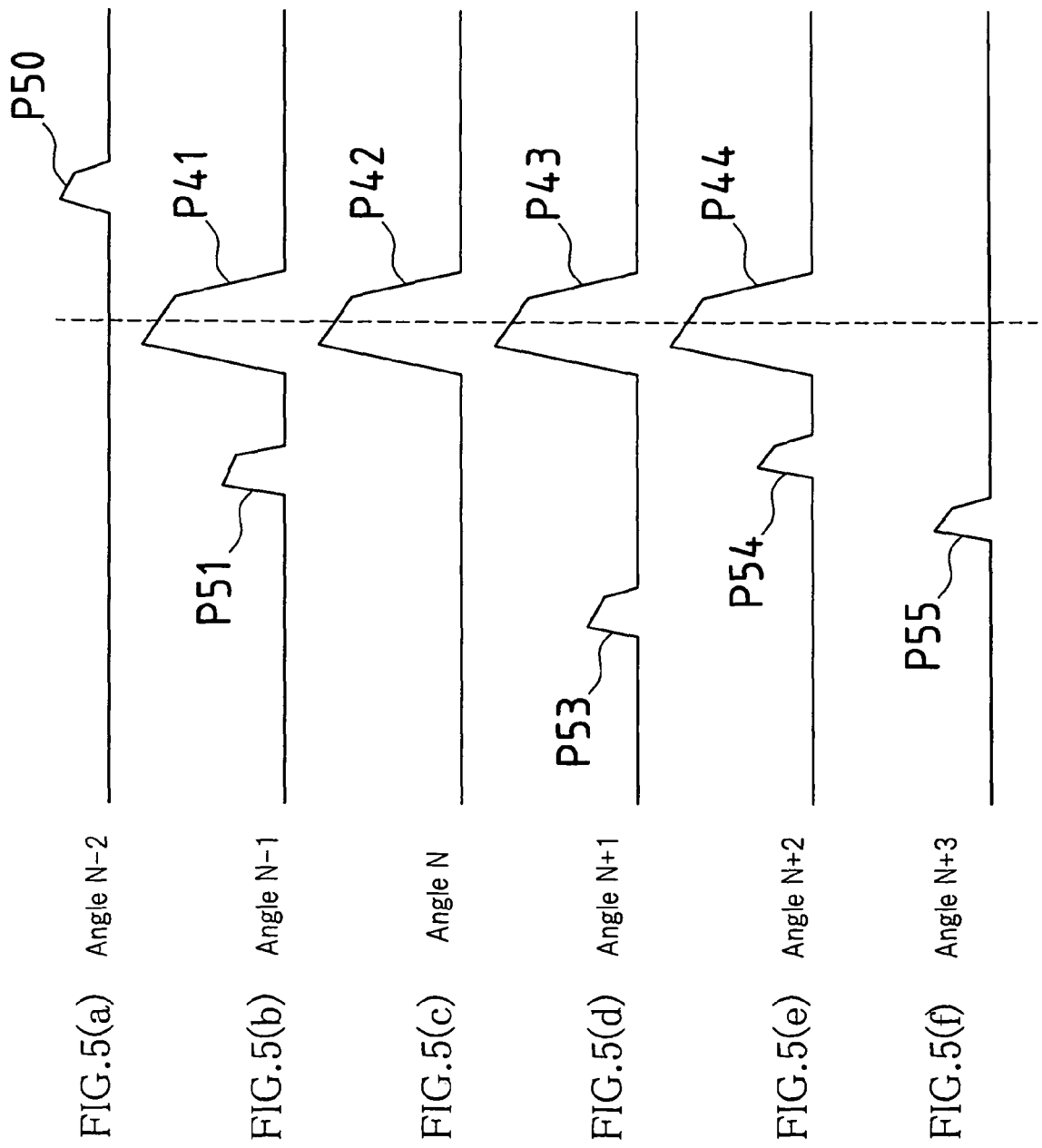

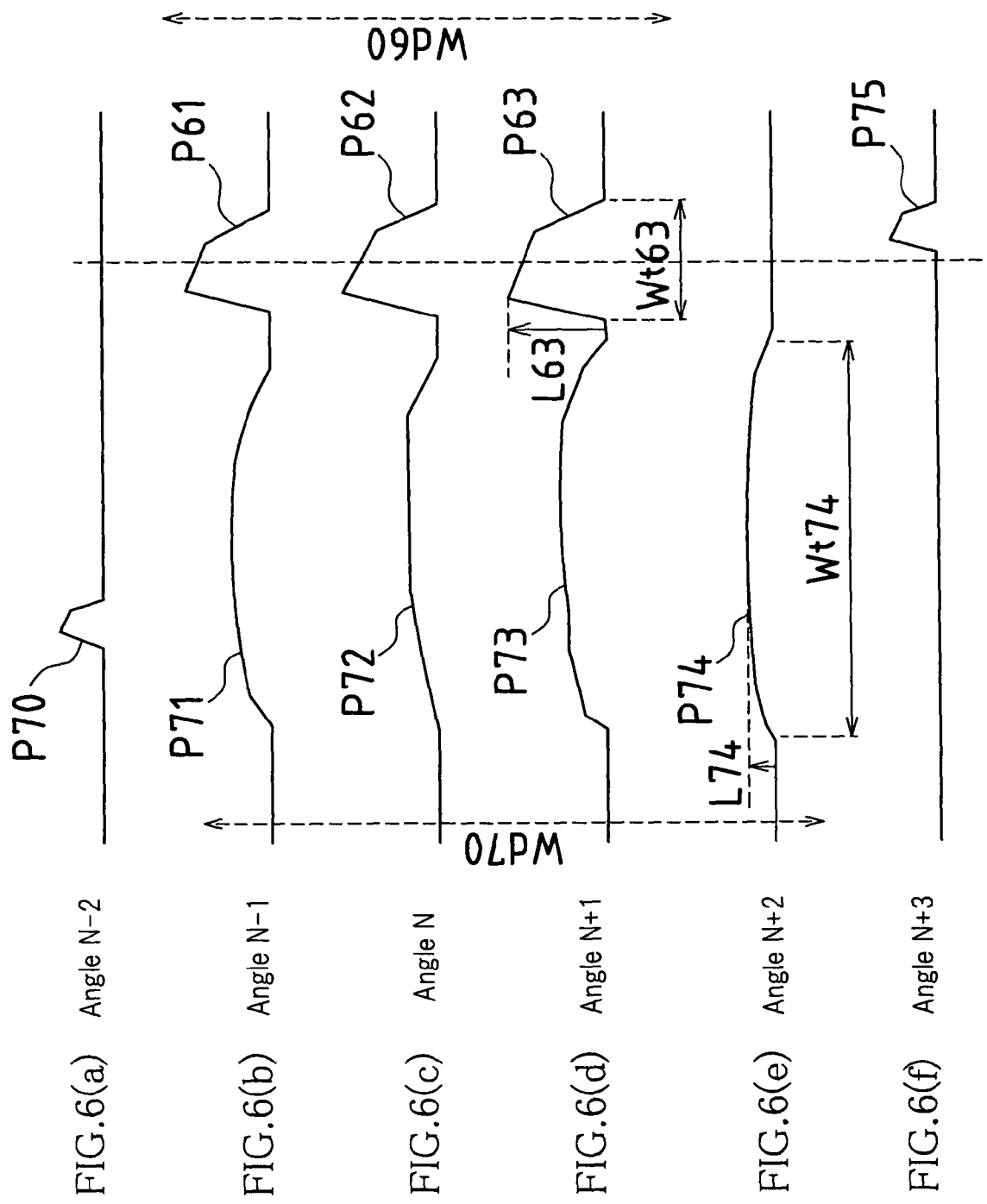

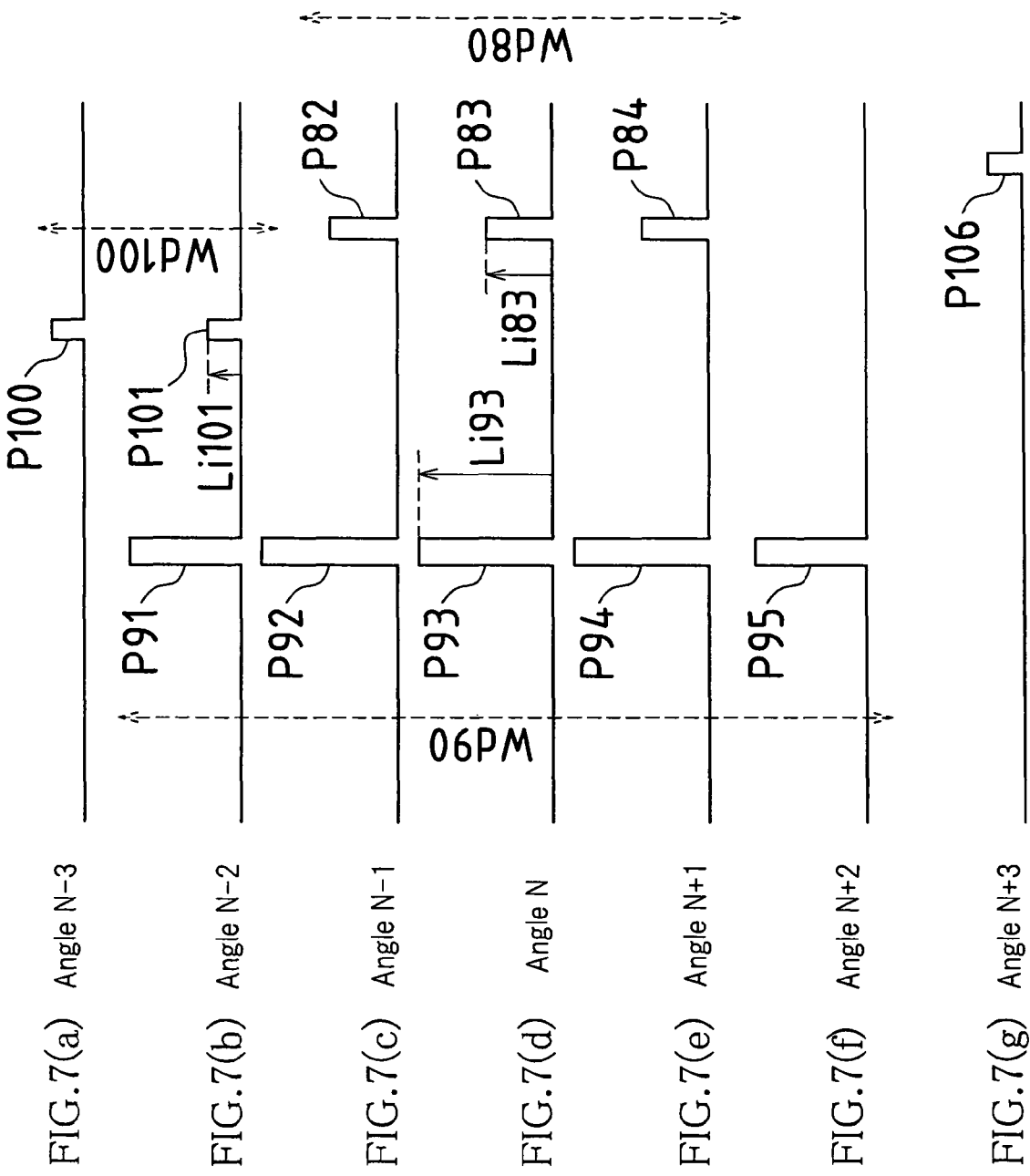

LASER AREA SENSOR

CROSS-REFERENCE TO RELATED APPLICATIONS

This application claims priority under 35 U.S.C. §119(a) on Patent Application No. 2007-278957 filed in Japan on Oct. 26, 2007, the entire contents of which are herein incorporated by reference.

BACKGROUND OF THE INVENTION

1. Field of the Invention

The present invention relates to a laser area sensor that detects, for example, an intruder or the like in the building premises. In particular, the present invention relates to a laser area sensor in which reliability of detecting an intruder or the like by the laser area sensor can be maintained even in bad weather conditions.

2. Related Art

Conventionally, as one type of crime prevention apparatuses, a microwave sensor is known that transmits microwaves toward a detection area, and, if an intruder is present in the detection area, receives waves reflected by the intruder and detects the intruder.

Also, a 'security system' for detecting an intruder using a laser range finder that adopts laser light as a light source instead of microwaves has been proposed (see Japanese Patent No. 3011121 (hereinafter, referred to as 'Patent Document 1'), for example).

This 'security system' comprises: a sensor portion that sets a monitored area according to a scanning angle at which two-dimensional scanning is performed with light of an optical range finder, and, if an intruder within the area is detected, outputs distance data and angle data of the intruder; a swivel camera portion that is disposed on an electrically-driven swivel base and swivels in conjunction with the sensor portion; and a control portion that has a function to detect whether or not an intruder is present upon a plurality of successive changes in the distance data or the angle data detected by the sensor portion, calculate the position of the intruder based on the changed distance data and angle data from the sensor portion, swivel the swivel camera portion of the electrically-driven swivel base according to the positional data, and display image data of the intruder on a monitor.

Although slightly different from crime prevention apparatuses or security systems, an 'object identifying method using an area sensor' that can accurately identify a pedestrian or the like using laser light also has been proposed (see JP 2004-185363A (hereinafter, referred to as 'Patent Document 2'), for example).

According to this 'object identifying method using an area sensor', the light reflection time is measured in scanning performed by causing pulsed laser light to be projected by an area sensor comprising a laser sensor to a detection area that includes a walking area in which pedestrians are guided and an area around the walking area, a difference between the reflection time when no object is present and the reflection time when an object is present is obtained for each scanning point, thereby calculating the shape and the size of the object, and a vector obtained by a change in the position of the object in each scanning, and an object that moves in the guide direction in the walking area and an object that moves in a direction cutting across the walking area are identified based on calculated signals.

However, with a laser range finder used in a security system as in Patent Document 1 above and a laser sensor used in an object identifying method using an area sensor as in Patent Document 2 above, the laser light may be reflected or attenuated by, for example, rain, snow, dense fog or the like during bad outdoor weather conditions, interfering with accurate detection of an intruder or the like.

SUMMARY OF THE INVENTION

It is an object of the present invention to provide a laser area sensor that can accurately detect an intruder or the like regardless of the installation location and weather conditions by eliminating, to the highest degree possible, the negative effects on the laser light during bad outdoor weather conditions or the like, and that can prevent erroneous detection to the highest degree possible.

The present invention is directed to a laser area sensor, including: a first laser range finder that emits pulsed laser light, measures a period of time for light reflected by at least one object that is present in a laser light emitting direction to return thereby to obtain distance information to the object and light-reception level information of the reflected light; a scanning mechanism portion that changes a measurement direction of the first laser range finder; an information acquiring portion that defines a detection area and acquires distance information and light-reception level information in each measurement direction in the detection area in a time-series manner, by the first laser range finder periodically performing measurement while the scanning mechanism portion changes the measurement direction; a first information correcting portion that, if there is a discontinuous change exceeding a predetermined amount when the distance information and light-reception level information acquired by the information acquiring portion in each measurement direction are compared with distance information and light-reception level information of preceding and succeeding measurement periods of the measurement period, removes distance information corresponding to the discontinuous change in the measurement period in the measurement direction and corrects light-reception level information of a portion that does not correspond to the discontinuous change; a human body judging portion that extracts a portion that is presumed to correspond to a human body, from the distance information corrected by the first information correcting portion, and judges whether or not the extracted portion matches a human body based on a time-series moving status of the extracted portion; and a human body detection signal output portion that outputs a human body detection signal if the human body judging portion judges that a human body is present.

With the laser area sensor thus configured, distance data with a possibility of being generated by, for example, rain, snow or the like is removed in advance and the influence of attenuation and the like is appropriately corrected. Accordingly, an intruder or the like can be detected accurately even in rainy or snowy conditions, and erroneous detection can be prevented to the highest degree possible.

Alternatively, the laser area sensor of the present invention may be configured to include a first laser range finder that emits pulsed laser light, measures a period of time for light reflected by at least one object that is present in a laser light emitting direction to return thereby to obtain distance information to the object and light-reception level information of the reflected light; a scanning mechanism portion that changes a measurement direction of the first laser range finder; an information acquiring portion that defines a detection area and acquires distance information and light-reception level information in each measurement direction in the detection area in a time-series manner, by the first laser range finder periodically performing measurement while the scanning mechanism portion changes the measurement direction; a second information correcting portion that, if there is a discontinuous change exceeding a predetermined amount when the distance information and light-reception level information acquired by the information acquiring portion in each measurement period are compared with distance information and light-reception level information of measurement directions adjacent to the measurement direction, removes distance information corresponding to the discontinuous change in the measurement direction in the measurement period; a human body judging portion that extracts a portion that is presumed to correspond to a human body, from the distance information corrected by the second information correcting portion, and judges whether or not the extracted portion matches a human body based on a time-series moving status of the extracted portion; and a human body detection signal output portion that outputs a human body detection signal if the human body judging portion judges that a human body is present.

With the laser area sensor thus configured, distance data with a possibility of being generated by, for example, rain, snow or the like is removed in advance. Accordingly, an intruder or the like can be detected accurately even in rainy or snowy conditions, and erroneous detection can be prevented to the highest degree possible.

Alternatively, the laser area sensor of the present invention may be configured to include a first laser range finder that emits pulsed laser light, measures a period of time for light reflected by at least one object that is present in a laser light emitting direction to return thereby to obtain distance information to the object and light-reception level information of the reflected light; a scanning mechanism portion that changes a measurement direction of the first laser range finder; an information acquiring portion that defines a detection area and acquires distance information and light-reception level information in each measurement direction in the detection area in a time-series manner, by the first laser range finder periodically performing measurement while the scanning mechanism portion changes the measurement direction; a first information correcting portion that, if there is a discontinuous change exceeding a predetermined amount when the distance information and light-reception level information acquired by the information acquiring portion in each measurement direction are compared with distance information and light-reception level information of preceding and succeeding measurement periods of the measurement period, removes distance information corresponding to the discontinuous change in the measurement period in the measurement direction and corrects light-reception level information of a portion that does not correspond to the discontinuous change; a second information correcting portion that, if there is a discontinuous change exceeding a predetermined amount when the distance information and light-reception level information acquired by the information acquiring portion in each measurement period are compared with distance information and light-reception level information of measurement directions adjacent to the measurement direction, removes distance information corresponding to the discontinuous change in the measurement direction in the measurement period; a human body judging portion that extracts a portion that is presumed to correspond to a human body, from the distance information corrected by the first information correcting portion and the second information correcting portion, and judges whether or not the extracted portion matches a human body based on a time-series moving status of the extracted portion; and a human body detection signal output portion that outputs a human body detection signal if the human body judging portion judges that a human body is present.

With the laser area sensor thus configured, distance data with a possibility of being generated by, for example, rain, snow or the like is removed in advance and the influence of attenuation and the like is appropriately corrected, even more accurate detection of an intruder or the like can be performed even in rainy or snowy conditions, and erroneous detection can be prevented to the highest degree possible.

Alternatively, the laser area sensor of the present invention may be configured to include a second laser range finder that emits pulsed laser light, measures a period of time for light reflected by at least one object that is present in a laser light emitting direction to return thereby to obtain distance information to the object and light-reception level information of the reflected light and time width information along the time axis of the reflected light; a scanning mechanism portion that changes a measurement direction of the second laser range finder; an information acquiring portion that defines a detection area and acquires distance information, light-reception level information and time width information in each measurement direction in the detection area in a time-series manner, by the second laser range finder periodically performing measurement while the scanning mechanism portion changes the measurement direction; an information correcting portion that performs correction with a second information correcting function that, if there is a discontinuous change exceeding a predetermined amount when the distance information and light-reception level information acquired by the information acquiring portion in each measurement period are compared with distance information and light-reception level information of measurement directions adjacent to the measurement direction, removes distance information corresponding to the discontinuous change in the measurement direction in the measurement period, and with a third information correcting function that, when a measurement direction range in which an amount of change between adjacent measurement directions all falls within a predetermined range is referred to as a detection angle width when the distance information, light-reception level information and time width information acquired by the information acquiring portion in each measurement period are compared with distance information, light-reception level information and time width information of a plurality of measurement directions adjacent to the measurement direction, removes specific distance information if light-reception level information, time width information and detection angle width that correspond to the specific distance information in the measurement direction satisfies a predetermined relationship; a human body judging portion that extracts a portion that is presumed to correspond to a human body, from the distance information corrected by the information correcting portion, and judges whether or not the extracted portion matches a human body based on a time-series moving status of the extracted portion; and a human body detection signal output portion that outputs a human body detection signal if the human body judging portion judges that a human body is present.

The information correcting portion may be configured to also perform correction with a first information correcting function that, if there is a discontinuous change exceeding a predetermined amount when the distance information and light-reception level information acquired by the information acquiring portion in each measurement direction are compared with distance information and light-reception level information of preceding and succeeding measurement periods of the measurement period, removes distance information corresponding to the discontinuous change in the measurement period in the measurement direction and corrects light-reception level information of a portion that does not correspond to the discontinuous change.

The third information correcting function of the information correcting portion may be configured to remove the specific distance information in the measurement direction in the measurement period if time width information corresponding to the specific distance information is not less than a predetermined time width.

The third information correcting function of the information correcting portion may be configured to remove the specific distance information in the measurement direction in the measurement period if a detection angle width corresponding to the specific distance information is not less than a predetermined angle width.

The third information correcting function of the information correcting portion may be configured to remove the specific distance information in the measurement direction in the measurement period if time width information corresponding to the specific distance information is not less than a predetermined time width and a detection angle width corresponding to the specific distance information is not less than a predetermined angle width.

The third information correcting function of the information correcting portion may be configured to remove the specific distance information in the measurement direction in the measurement period if the ratio between time width information corresponding to the specific distance information and detection angle width corresponding to the specific distance information is not less than a predetermined ratio.

The third information correcting function of the information correcting portion may be configured to remove the specific distance information in the measurement direction in the measurement period only when the average of light-reception level information in the detection angle width corresponding to the specific distance information is not greater than a predetermined value.

With the laser area sensor thus configured, distance data with a possibility of being generated by, for example, not only by rain or snow, but also dense fog or the like is removed in advance. Accordingly, an intruder or the like can be detected accurately not only in rainy or snowy conditions but also in dense fog conditions, and erroneous detection can be prevented to the highest degree possible.

Alternatively, the laser area sensor of the present invention may be configured to include a third laser range finder that emits pulsed laser light, measures a period of time for light reflected by at least one object that is present in a laser light emitting direction to return thereby to obtain distance information to the object and light-reception level time integration information in which the light-reception level of the reflected light is time-integrated; a scanning mechanism portion that changes a measurement direction of the third laser range finder; an information acquiring portion that defines a detection area and acquires distance information and light-reception level time integration information in each measurement direction in the detection area in a time-series manner, by the third laser range finder periodically performing measurement while the scanning mechanism portion changes the measurement direction; an information correcting portion that, when a measurement direction range in which an amount of change between adjacent measurement directions all falls within a predetermined range is referred to as a detection angle width when the distance information and light-reception level time integration information acquired by the information acquiring portion in each measurement period are compared with distance information and light-reception level time integration information of a plurality of measurement directions adjacent to the measurement direction, removes first distance information of the measurement period if first light-reception level time integration information and a first detection angle width that correspond to the first distance information of the measurement direction satisfies a predetermined relationship; a human body judging portion that extracts a portion that is presumed to correspond to a human body, from the distance information corrected by the information correcting portion, and judges whether or not the extracted portion matches a human body based on a time-series moving status of the extracted portion; and a human body detection signal output portion that outputs a human body detection signal if the human body judging portion judges that a human body is present.

The information correcting portion may be configured to remove the first distance information of the measurement period if the first detection angle width is not less than a predetermined angle width.

The information correcting portion may be configured to remove the first distance information of the measurement period if the first detection angle width is not less than a predetermined angle width and other distance information that includes at least one of a plurality of measurement directions included in the first detection angle width as a corresponding detection angle width exists further away.

The information correcting portion may be configured to remove the first distance information of the measurement period if a first average of the first detection angle width of the first light-reception level time integration information is greater than an average of respective detection angle widths or an average of all detection angle widths of light-reception level time integration information corresponding to other distance information that includes at least one of a plurality of measurement directions included in the first detection angle width as a corresponding detection angle width by a predetermined amount or more.

The information correcting portion may be configured to remove the first distance information of the measurement period if the first detection angle width is greater than respective detection angle widths corresponding to other distance information that includes at least one of a plurality of measurement directions included in the first detection angle width as a corresponding detection angle width by a predetermined amount or more.

The information correcting portion may be configured to remove the first distance information of the measurement period if a first average of the first detection angle width of the first light-reception level time integration information is greater than an average of respective detection angle widths or an average of all detection angle widths of light-reception level time integration information corresponding to other distance information that includes at least one of a plurality of measurement directions included in the first detection angle width as a corresponding detection angle width by a predetermined amount or more, and the first detection angle width is greater than respective detection angle widths corresponding to other distance information that includes at least one of a plurality of measurement directions included in the first detection angle width as a corresponding detection angle width by a predetermined amount or more.

With the laser area sensor thus configured, distance data with a possibility of being generated by, for example, not only by rain or snow, but also dense fog or the like is removed with even higher accuracy. Accordingly, an intruder or the like can be detected accurately not only in rainy or snowy conditions but also in dense fog conditions, and erroneous detection can be prevented to the highest degree possible.

BRIEF DESCRIPTION OF THE DRAWINGS

FIGS. 4(a) to 4(d) are time charts illustrating exemplary signal waveforms of projected pulsed laser light and received reflected light in a specific measurement direction in a rainy condition obtained by the laser area sensor 100 of FIG. 1. FIG. 4(a) shows a signal waveform of projected pulsed laser light (the same is used for each measurement period). FIG. 4(b) shows a signal waveform of received reflected light in the Mth measurement period. FIG. 4(c) shows a signal waveform of received reflected light in the (M+1)th measurement period. FIG. 4(d) shows a signal waveform of received reflected light in the (M+2)th measurement period.

FIGS. 5(a) to 5(f) are time charts illustrating exemplary signal waveforms of received reflected pulsed laser light in a specific measurement period in a rainy condition obtained by a laser area sensor according to a second embodiment of the present invention. FIG. 5(a) shows a signal waveform of received light with the measurement direction being Angle N−2. FIG. 5(b) shows a signal waveform of received light with the measurement direction being Angle N−1. FIG. 5(c) shows a signal waveform of received light with the measurement direction being Angle N. FIG. 5(d) shows a signal waveform of received light with the measurement direction being Angle N+1. FIG. 5(e) shows a signal waveform of received light with the measurement direction being Angle N+2. FIG. 5(f) shows a signal waveform of received light with the measurement direction being Angle N+3.

FIGS. 6(a) to 6(f) are time charts illustrating exemplary signal waveforms of received reflected pulsed laser light in a specific measurement period in a dense fog condition obtained by a laser area sensor according to a third embodiment of the present invention. FIG. 6(a) shows a signal waveform of received light with the measurement direction being Angle N−2. FIG. 6(b) shows a signal waveform of received light with the measurement direction being Angle N−1. FIG. 6(c) shows a signal waveform of received light with the measurement direction being Angle N. FIG. 6(d) shows a signal waveform of received light with the measurement direction being Angle N+1. FIG. 6(e) shows a signal waveform of received light with the measurement direction being Angle N+2. FIG. 6(f) shows a signal waveform of received light with the measurement direction being Angle N+3.

FIGS. 7(a) to 7(g) are time charts illustrating exemplary signal waveforms of received reflected pulsed laser light in a specific measurement period in a dense fog condition obtained by a laser area sensor according to a fourth embodiment of the present invention. FIG. 7(a) shows a signal waveform of received light with the measurement direction being Angle N−3. FIG. 7(b) shows a signal waveform of received light with the measurement direction being Angle N−2. FIG. 7(c) shows a signal waveform of received light with the measurement direction being Angle N−1. FIG. 7(d) shows a signal waveform of received light with the measurement direction being Angle N. FIG. 7(e) shows a signal waveform of received light with the measurement direction being Angle N+1. FIG. 7(f) shows a signal waveform of received light with the measurement direction being Angle N+2. FIG. 7(g) shows a signal waveform of received light with the measurement direction being Angle N+3.

DESCRIPTION OF THE PREFERRED EMBODIMENTS

Hereinafter, embodiments of the present invention will be described with reference to the drawings.

First Embodiment

Figure 1:
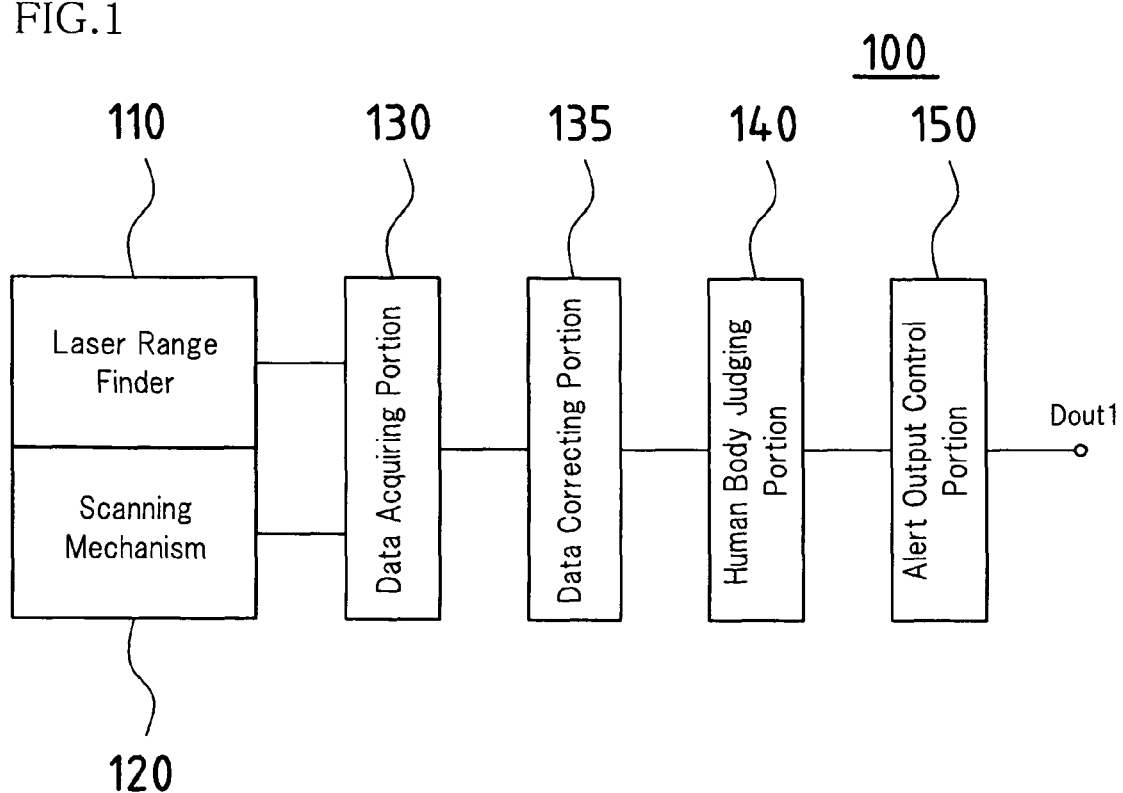
FIG. 1 is a block diagram showing the schematic configuration of a laser area sensor 100 according to a first embodiment of the present invention.
Figure 2:
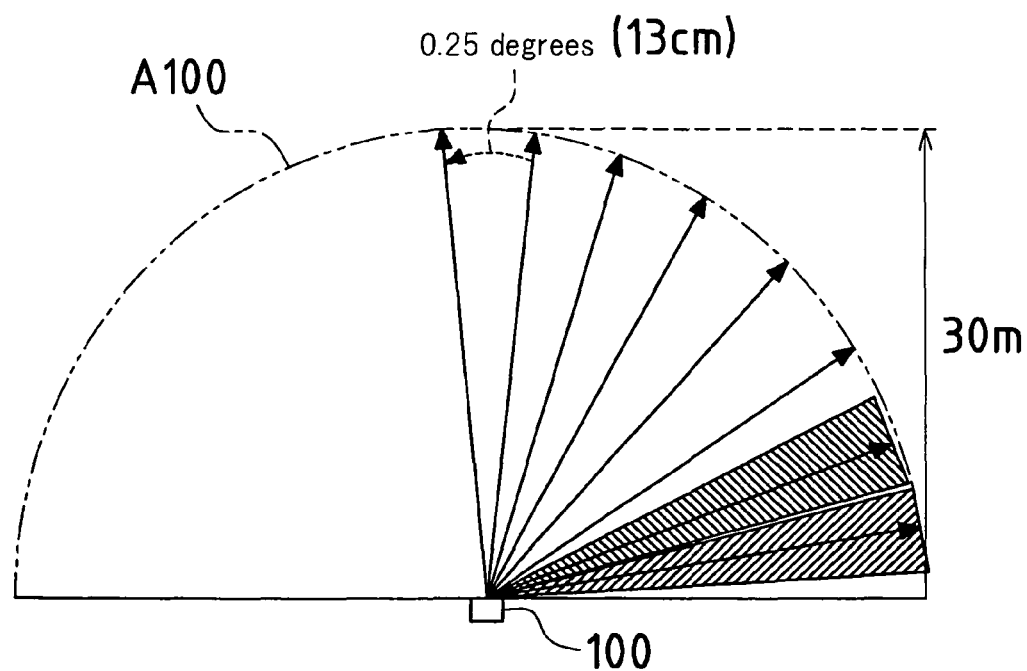
FIG. 2 is a schematic explanatory view of a detection area A100 defined by the laser area sensor 100 of FIG. 1.
Figure 3:
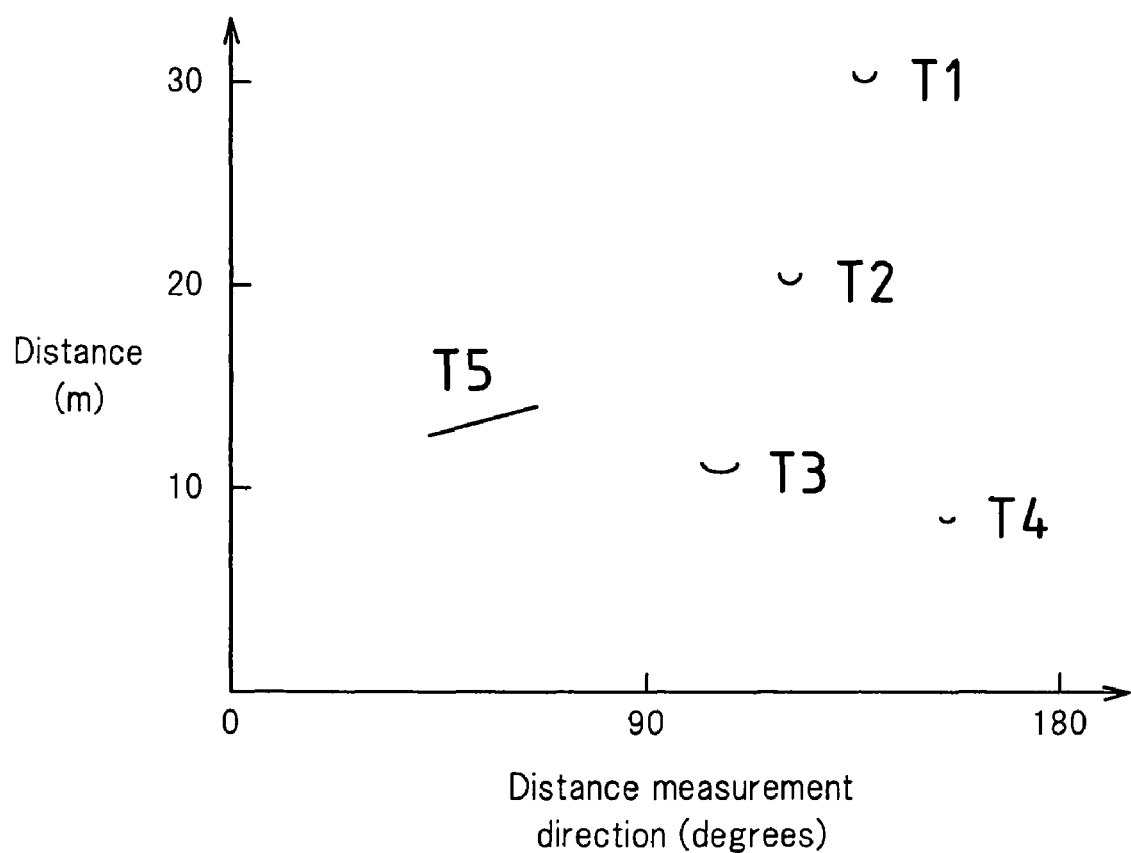
FIG. 3 is an explanatory graph showing an example of distance data acquired by the laser area sensor 100 of FIG. 1.

FIG. 1 is a block diagram showing the schematic configuration of a laser area sensor 100 according to a first embodiment of the present invention. FIG. 2 is a schematic explanatory view of a detection area defined by the laser area sensor 100. FIG. 3 is an explanatory graph showing an example of distance data acquired by the laser area sensor 100. In FIG. 2, the interval between adjacent distance measurement directions is shown much wider than the actual interval, for the sake of explanation.

<Overall Configuration>

As shown in FIG. 1, the laser area sensor 100 includes a laser range finder 110, a scanning mechanism 120, a data acquiring portion 130, a data correcting portion 135, a human body judging portion 140, and an alert output control portion 150.

The laser range finder 110 emits pulsed laser light, and precisely measures an extremely short period of time for reflected light to return from at least one object that is present in a laser light emitting direction, thereby accurately measuring the distance to the object and acquiring the light-reception level of the reflected light. Examples of a light-emitting element of laser light in the laser range finder 110 include a semiconductor laser diode (LD). Examples of a light-receiving element include an avalanche photodiode (APD). It is desirable to arrange a dedicated hardware circuit and the like, for example, for performing drive control of the light-emitting element, for measuring a period of time for reflected light to return, and for acquiring and recording a level of received reflected light, but the present invention is not limited to such a configuration. Laser range finders usually can precisely measure a considerably long distance, for example, several tens of meters at the maximum and even a much longer distance in some cases, but the maximum detection distance of this laser range finder 110 is set to 30 m.

The scanning mechanism 120 can rotate due to an embedded motor (not shown) or the like, and is mechanically connected to at least part of the laser range finder 110 so that a direction (angle) in which the laser range finder 110 measures distance can be changed. For example, a configuration is conceivable in which only an optical system portion in the laser range finder 110 is rotated, but other configurations, for example, in which the entire laser range finder 110 is rotated also can be adopted. When the scanning mechanism 120 rotates at a certain speed in a predetermined direction, the direction in which the laser range finder 110 measures distance changes in conjunction with this rotation.

The data acquiring portion 130 defines a detection area A100 as shown in FIG. 2 and acquires distance data and data regarding the level of received reflected light in each direction at predetermined angle intervals in the detection area A100 every predetermined period of time in a time-series manner, by the laser range finder 110 periodically performing measurement while the scanning mechanism 120 changes the measurement direction.

For example, if a scanning period T of the scanning mechanism 120 is 50 ms (scanning is performed 20 times a second), distance is measured by emitting pulsed laser light in a range of 180 degrees, which is half of one rotation, the pulse width of pulsed laser light is 34 ns, and the light-emitting period is 34.7 µs, then distance can be measured 720 times in a range of 180 degrees. In this case, the angle interval in the distance measurement is 0.25 degrees, which corresponds to a length as small as approximately 13 cm even at a distance of 30 m away as shown in FIG. 2, and thus the spatial resolution in the detection area A100 is considerably high. Thus, it is possible to considerably accurately identify the position, the size, the shape, and the like of an object based on the distance data or the like acquired by the data acquiring portion 130, thereby judging, for example, whether or not the object is a human body. Furthermore, even in a case where a plurality of human bodies are present in the detection area A100, the human bodies also can be individually identified. This sort of distance data can be obtained every 50 ms, which is the scanning period T. It should be noted that values shown herein are merely an example.

The data correcting portion 135 analyzes the distance data or the like acquired by the data acquiring portion 130. If it is determined that reflection or attenuation of the pulsed laser light has occurred due to, for example, rain, snow, dense fog or the like during bad outdoor weather conditions, the data correcting portion 135 removes or corrects the distance data of the pertinent location. This will be described later in detail.

The human body judging portion 140 first analyses the distance data acquired by the data acquiring portion 130 and corrected by the data correcting portion 135 where appropriate, and extracts a portion that is presumed to match a human body shape from the distance data.

For example, if a human body is oriented toward the laser area sensor 100, the width of the human trunk portion corresponds to approximately three adjacent data items at a distance of 30 m, assuming that the width of the human trunk portion is 40 cm because it is approximately several tens of centimeters. The shorter the distance is, the narrower the width between adjacent data items becomes. For example, if the distance is 20 m, the width is approximately 8.8 cm. If the distance is 10 m, the width is approximately 4.4 cm. At that time, the number of adjacent data items corresponding to the same actual width increases, and thus, for example, if the distance is 10 m, a width of 40 cm corresponds to approximately nine adjacent data items.

It will be appreciated that if a human body is not oriented toward the laser area sensor 100, but oriented in an oblique or lateral direction, the width that appears in the distance data is narrower. Furthermore, since a human body has a gentle curve, a portion closer to the center of adjacent data items corresponding to the human body is to have a slightly shorter distance. As shown in FIG. 3, a human body is expressed as a gentle curve protruding downward with a certain width as shown in T1, T2, and T3. If this sort of portion is present in the distance data, it is judged that this portion has a possibility of being a human body.

If the width is too narrow as shown in T4, or the width is too wide and the shape is linear as shown in T5, it is clearly judged that these portions are not a human body.

The distance data is acquired by the data acquiring portion 130 in a time-series manner. Thus, how a portion judged to have a possibility of being a human body in the distance data changes in subsequent distance data, that is, moving distance, is obtained, moving speed and the like are calculated based on the moving distance, and thus a moving status is determined. Since there is a limitation in the moving speed of a human body, if the moving distance or moving speed is extremely high, it is judged that the object has a high possibility of not being a human body. Also, for example, if the movement flow line is significantly discontinuous, it is judged that the object has a high possibility of not being a human body. It is also possible to judge whether the object is an intruder for which surveillance has to be exercised, or a passer-by merely walking in an area near the boundary of the detection area A100, also taking other factors such as movement direction into consideration. Comprehensively considering the above-described judgments and the like, it is judged whether or not a human body for which surveillance has to be exercised is present.

Even if an object at a distance of greater than 30 m is detected, this object is outside the detection area A100, and thus it is not judged as described above whether or not this object is a human body. However, the configuration is not limited to this.

If the human body judging portion 140 judges that a human body is present, the alert output control portion 150 outputs an alert signal Dout1.

The data acquiring portion 130, the data correcting portion 135, the human body judging portion 140, the alert output control portion 150, and the like can be constituted, for example, by device-embedded one-chip microcomputers by way of software processing. The above-described judgment processing and the like can be realized with a pattern matching technique or the like. Accordingly, one-chip microcomputers with comparatively low cost can be used, and thus a contribution can be made to lowering the cost of the entire laser area sensor 100. Here, it is not absolutely necessary to configure them using one-chip microcomputers.

<Influence of Rain, Snow, Etc. and Actions Taken Against them>

Cases often arise where the pulsed laser light is reflected or attenuated by, for example, rain, snow or the like, interfering with accurate detection of an intruder or the like. Thus, the following provides a description of the influence that can be placed on the pulsed laser light or the like if such a case occurs as well as actions taken against them by the data correcting portion 135.

FIGS. 4(a) to 4(d) are time charts illustrating exemplary signal waveforms of projected pulsed laser light and received reflected light in a specific measurement direction in a rainy condition obtained by the laser area sensor 100 according to the first embodiment of the present invention. FIG. 4(a) shows a signal waveform of projected pulsed laser light (the same is used for each measurement period). FIG. 4(b) shows a signal waveform of received reflected light in the Mth measurement period. FIG. 4(c) shows a signal waveform of received reflected light in the (M+1)th measurement period. FIG. 4(d) shows a signal waveform of received reflected light in the (M+2)th measurement period. It should be noted that these time charts are shown merely for the sake of explanation, and it does not mean that the laser area sensor 100 obtains waveform signals as shown. This applies to other time charts that will be referred to in the description given below.

If it is assumed that pulsed laser light emitted from the laser range finder 110 has a waveform like Pulse P0 shown in FIG. 4(a), then, for example, in the Mth measurement period, a waveform as shown in FIG. 4(b) that includes a pulse having a substantially similar shape, namely, Pulse P10 is obtained if the pulsed laser light does not receive any influence of raindrops on its optical path.

Where the time difference between Pulses P0 and P10 is represented by $\Delta t1$, the distance d1 to an object that has reflected the pulsed laser light, such as a human body, can be determined by calculation as a distance over which the pulsed laser light has traveled during the time difference Δt1.

In the next measurement period, namely, the (M+1)th period, if a raindrop happens to exist at a distance that is closer to the sensor than the object and the raindrop reflects part of the pulsed laser light, as shown in FIG. 4(c), the light reflected by the raindrop returns first and appears as a small pulse, namely, Pulse P20, and the remaining pulsed laser light that was not reflected by the raindrop is reflected by the object such as a human body, and as a result appears as Pulse P11 as in the case of FIG. 4(b).

Where the time difference between Pulses P0 and P20 is represented by Δt2, the distance d2 to the raindrop that has reflected the pulsed laser light can be determined by calculation in the same manner as the distance d1 is determined. Since the distance over which a human body or the like can move in a short time corresponding to a single measurement period is extremely small, there appears to be little difference between the distance d1 and the distance determined by calculation based on the time difference between Pulses P0 and P11. However, the light-reception level L11 of Pulse P11 is believed to be attenuated relative to the light-reception level L10 of Pulse P10 due to the raindrop that has reflected part of the pulsed laser light, and thus the amount of attenuation is represented by ΔL11.

In the next measurement period, namely, the (M+2)th period, if another raindrop happens to exist at a distance that is closer to the sensor than the object and the raindrop of FIG. 4(c) and the raindrop reflects part of the pulsed laser light, as shown in FIG. 4(d), the light reflected by the raindrop returns first and appears as a small pulse, namely, Pulse P30, and the remaining pulsed laser light that was not reflected by the raindrop is reflected by the object such as a human body, and as a result appears as Pulse P12 as in the case of FIG. 4(b).

Where the time difference between Pulses P0 and P30 is represented by Δt3, the distance d3 to another raindrop that has reflected the pulsed laser light can be determined by calculation in the same manner as the distance d1 is determined. Since the distance over which a human body or the like can move in a short time corresponding to a single measurement period is extremely small, there appears to be little difference between the distance d1 and the distance determined by calculation based on the time difference between Pulses P0 and P12. However, the light-reception level L12 of Pulse P12 is believed to be attenuated relative to the light-reception level L10 of Pulse P10 due to the raindrop that has reflected part of the pulsed laser light, and thus the amount of attenuation is represented by ΔL12. As shown in FIG. 4(d), if the distance d3 is shorter than the distance d2, usually, the amount of pulsed laser light reflected by a raindrop is larger than that of pulsed laser light reflected by the raindrop of FIG. 4(c), and thus it is conceived that the amount of attenuation ΔL12 will also be larger than the amount of attenuation ΔL11 accordingly. Here, it is quite apparent that the raindrop of FIG. 4(c) has already descended during the time period corresponding to a single measurement period, and so there is little probability that another raindrop happens to exist at a position corresponding to substantially the same distance.

As can be seen from the foregoing explanations, Pulse P20 and Pulse P30 that appear when part of pulsed laser light is reflected by a raindrop usually do not appear in the signal waveforms of reflected light of preceding and succeeding measurement periods in the same measurement direction. The distances d2 and d3 corresponding to Pulses P20 and P30 differ significantly from the distance d1 corresponding to Pulse P10 and the distances corresponding to Pulse P11 and Pulse P12. That is, when specific distance data obtained in a measurement period is significantly different from the distance data obtained in preceding and succeeding measurement periods in the same measurement direction, and there is a discontinuous change, it is possible to judge that the object that corresponds to the specific distance data corresponding to the discontinuous change is at least not a human body, but is likely to be a raindrop, snowdrop or the like. Such specific distance data should not be used as a basis for judging from the viewpoint of preventing erroneous detection from occurring in a subsequent human body determining process and the like. For this reason, such specific distance data is removed in advance.

In a measurement period in which such specific distance data is present, attenuation should be observed in data regarding the light-reception level of reflected light. Accordingly, data items regarding light-reception levels corresponding to substantially the same distance data of preceding and succeeding measurement periods in the same measurement direction are compared. Based on the comparison result, the attenuated light-reception level is corrected. For example, Pulse P11 is corrected so as to cancel out the amount of attenuation ΔL11, thereby obtaining a waveform including Pulse P11x. Likewise, Pulse P12 is corrected so as to cancel out the amount of attenuation ΔL12, thereby obtaining a waveform including Pulse P12x.

According to the configuration of the first embodiment described above, because distance data with a possibility of being generated by part of pulsed laser light reflected by, for example, rain, snow or the like that should not be used as a basis for human body judgment is removed in advance, and the influence of attenuation and the like is also corrected appropriately, an intruder or the like can be detected accurately even in rainy or snowy conditions, and erroneous detection can be prevented to the highest degree possible.

Second Embodiment

In the first embodiment, a configuration was shown in which distance data with a high possibility of being generated by the influence of rain, snow or the like is removed in advance by comparing distance data or the like between preceding and succeeding measurement periods in time series in each measurement direction. However, it is also possible to remove the distance data with a high possibility of being generated by the influence of rain, snow or the like in advance by comparing distance data or the like between adjacent measurement directions in each measurement period. Now, the following will describe a laser area sensor configured to achieve this as a second embodiment. The basic configuration and the like are substantially similar to those of the laser area sensor of the first embodiment, and thus only differences will be described in the description given hereunder.

FIGS. 5(a) to 5(f) are time charts illustrating exemplary signal waveforms of received reflected pulsed laser light in a specific measurement period in a rainy condition obtained by a laser area sensor according to the second embodiment of the present invention. FIG. 5(a) shows a signal waveform of received light with the measurement direction being Angle N−2. FIG. 5(b) shows a signal waveform of received light with the measurement direction being Angle N−1. FIG. 5(c) shows a signal waveform of received light with the measurement direction being Angle N. FIG. 5(d) shows a signal waveform of received light with the measurement direction being Angle N+1. FIG. 5(e) shows a signal waveform of received light with the measurement direction being Angle N+2. FIG. 5(*f*) shows a signal waveform of received light with the measurement direction being Angle N+3.

Because an object such as a human body has a certain size, substantially the same distance data should be observed over the angle range corresponding to the size of the object in the distance data items of all measurement directions obtained in the same measurement period.

Because the interval between adjacent measurement directions is approximately 13 cm at a distance of 30 m, as already explained with reference to FIG. 2, if it is assumed that the human body has a width of approximately several tens of centimeters, for example, Pulse P41, Pulse P42, Pulse P43 and Pulse P44 corresponding to substantially the same distance data appear over four adjacent measurement directions (from Angles N−1 to N+2) as shown in FIGS. 5(*b*) to 5(*e*).

On the other hand, a raindrop, snowdrop and the like are extremely small as compared to a human body, and as such, even if a raindrop, snowdrop or the like happens to be detected in a measurement direction and distance data corresponding to this is obtained, it is usually difficult to conceive that raindrops, snowdrops or the like that are present in substantially the same distance happen to be detected in adjacent measurement directions.

For example, in very heavy rain, even if relatively many raindrops are detected, and observed in the distance data items of all measurement directions (Pulse P50, Pulse P51, Pulse P53, Pulse P54 and Pulse P55), it is highly likely that the respective distance data items of the detected raindrops vary significantly, and it is unlikely that substantially the same distance data items exist in adjacent measurement directions.

Accordingly, the data correcting portion of the second embodiment is configured such that specific distance data obtained in a measurement period is compared with distance data obtained in an adjacent measurement direction in the same measurement period, if these distance data items are different significantly and there is a discontinuous change, a correction is performed to remove the specific distance data.

According to the configuration of the second embodiment described above, because distance data with a possibility of being generated by part of pulsed laser light reflected by, for example, rain, snow or the like that should not be used as a basis for human body judgment is removed in advance, an intruder or the like can be detected accurately even in rainy or snowy conditions, and erroneous detection can be prevented to the highest degree possible.

In the data correcting portion, the above-described correction may be combined with a correction similar to that described in the first embodiment, and executed. In this case, even more accurate detection of an intruder or the like can be performed, and erroneous detection can be prevented to the highest degree possible.

Third Embodiment

The first and second embodiments have discussed actions taken primarily against the influence of rain, snow and the like. However, in dense fog conditions, for example, water droplets suspended in the air as a fog are much smaller in size than raindrops or snowdrops, and so the effect of the actions may not be sufficiently effective. Here, a laser area sensor configured for taking actions against fog into account will be described as a third embodiment. The basic configuration and the like are substantially similar to those of the laser area sensors of the first and second embodiments, and thus only differences will be described in the description given hereunder.

The third embodiment is configured such that it is possible not only to obtain a distance to at least one object that is present in a direction of pulsed laser light emitted by the laser range finder and a light-reception level of reflected light, but also to obtain a pulse time width along the time axis. The data acquiring portion acquires distance data in each direction at predetermined angle intervals in the detection area, data regarding light-reception level of reflected light, and pulse time width data every predetermined period of time in a time-series manner.

FIGS. 6(*a*) to 6(*f*) are time charts illustrating exemplary signal waveforms of received reflected pulsed laser light in a specific measurement period in a dense fog condition obtained by the laser area sensor according to the third embodiment of the present invention. FIG. 6(*a*) shows a signal waveform of received light with the measurement direction being Angle N−2. FIG. 6(*b*) shows a signal waveform of received light with the measurement direction being Angle N−1. FIG. 6(*c*) shows a signal waveform of received light with the measurement direction being Angle N. FIG. 6(*d*) shows a signal waveform of received light with the measurement direction being Angle N+1. FIG. 6(*e*) shows a signal waveform of received light with the measurement direction being Angle N+2. FIG. 6(*f*) shows a signal waveform of received light with the measurement direction being Angle N+3.

In the third embodiment, distance data substantially similar to that of the second embodiment is obtained if a human body or the like is present; for example, Pulse P61, Pulse P62 and Pulse P63 as shown in FIGS. 6(*b*) to 6(*d*) that correspond to substantially the same distance data appear over three adjacent measurement directions (from Angles N−1 to N+1, angle width: Wd60). In this case, these pulses exhibit a similar time width (≈Wt63).

On the other hand, in a dense fog condition, an extremely large number of water droplets that are much smaller than raindrops, snowdrops and the like are suspended collectively in the air, and the pulsed laser light is diffused and reflected by the large number of small water droplets. As a result, in signal waveforms of received light, pulses, such as Pulse P71, Pulse P72, Pulse P73 and Pulse P74, appear in which the light-reception level hovers around a level lower than that of another reflection and the pulse time width along the time axis having a wider shape (pulse time width: equal to or around Wt74) continuously exists for a relatively long period of time. Unlike Pulses P70 and P75 generated by a raindrop or snowdrop, pulses with a substantially similar shape are present in adjacent measurement directions, and a substantially similar pulse condition is present over a continuously wide angle range (e.g., four adjacent measurement directions from Angles N−1 to N+2, angle width: Wd70).

Accordingly, in the data correcting portion of the third embodiment, the following correction may be performed in addition to a correction similar to that of the second embodiment.

For example, as in Pulse P74, when the pulse time width Wt74 is not less than a predetermined time width, the corresponding distance data may be removed.

Furthermore, as in Pulse P71, Pulse P72, Pulse P73 and Pulse P74, when the angle width Wd70 is not less than a predetermined angle width (e.g., when four or more measurement directions are included), the corresponding distance data may be removed.

Furthermore, when the pulse time width Wt74 is not less than a predetermined time width as in Pulse P74, and when the angle width Wd70 of Pulses P71, P72 and P73 that are adjacent to Pulse P74 is also not less than a predetermined angle width, the corresponding distance data may be removed.

Furthermore, when the ratio (Wd70/Wt74) between the pulse time width Wt74 as in Pulse P74 and the angle width Wd70 of Pulses P71, P72 and P73 that are adjacent to Pulse P74 is not less than a predetermined value, the corresponding distance data may be removed.

Furthermore, whether or not to actually remove the distance data corresponding to Pulse P71, Pulse P72, Pulse P73, Pulse P74 may be determined only when the average of the light-reception levels (L74, etc.) is sufficiently small (not greater than a predetermined value).

Alternatively, when the light-reception level corresponding to specific distance data is lower than the light-reception level corresponding to another distance data by a predetermined amount or more and the pulse time width corresponding to the specific distance data is longer than the pulse time width corresponding to another distance data by a predetermined amount or more (e.g., two times or more), a correction may be performed to remove the specific distance data.

A configuration is also possible in which an alert signal indicating that it is highly likely that a dense fog has occurred is outputted from an alert signal Dout1, or from another output terminal (not shown) or the like.

According to the configuration of the third embodiment described above, distance data with a possibility of being generated by part of pulsed laser light reflected, for example, not only by rain or snow, but also by dense fog or the like that should not be used as a basis for human body judgment is removed in advance, an intruder or the like can be detected accurately not only in rainy or snowy conditions, but also in dense fog conditions, and erroneous detection can be prevented to the highest degree possible.

In the data correcting portion, the above-described correction may be combined with a correction similar to that described in the first embodiment, and executed. In this case, even more accurate detection of an intruder or the like can be performed and erroneous detection can be prevented to the highest degree possible.

Fourth Embodiment

A fourth embodiment is configured to take actions against dense fog with a method slightly different from that of the third embodiment. The basic configuration and the like are substantially similar to those of the laser area sensors of the first to third embodiments, and thus only differences will be described in the description given hereunder.

The fourth embodiment is configured such that it is possible not only to obtain a distance to at least one object that is present in a direction of pulsed laser light emitted by the laser range finder, but also to obtain a time integration value of light-reception level of reflected light. The data acquiring portion acquires distance data in each direction at predetermined angle intervals in the detection area, and time integration data of the light-reception level from each predetermined period of time in a time-series manner.

FIGS. 7(a) to 7(g) are time charts illustrating exemplary signal waveforms of received reflected pulsed laser light in a specific measurement period in a dense fog condition obtained by the laser area sensor according to the fourth embodiment of the present invention. FIG. 7(a) shows a signal waveform of received light with the measurement direction being Angle N−3. FIG. 7(b) shows a signal waveform of received light with the measurement direction being Angle N−2. FIG. 7(c) shows a signal waveform of received light with the measurement direction being Angle N−1. FIG. 7(d) shows a signal waveform of received light with the measurement direction being Angle N. FIG. 7(e) shows a signal waveform of received light with the measurement direction being Angle N+1. FIG. 7(f) shows a signal waveform of received light with the measurement direction being Angle N+2. FIG. 7(g) shows a signal waveform of received light with the measurement direction being Angle N+3. It should be noted that the lateral width of the pulses of these time charts does not have any specific meaning.

In the fourth embodiment, if a human body or the like is present, for example, Pulse P82, Pulse P83 and Pulse P84 as shown in FIGS. 7(c) to 7(e) that correspond to substantially the same distance data appear over three adjacent measurement directions (from Angles N−1 to N+1, angle width: Wd80). A human body is considered to have a relatively high light reflection level, but the time width is relatively short. Accordingly, for example, the time integration value Li83 of Pulse P83 is relatively low. Similarly, the time integration values of Pulse P82 and Pulse P84 corresponding to substantially the same distance in adjacent measurement directions are also relatively low.

If another human body is present, for example, Pulse P100, Pulse P101 and the like may appear. The time integration values of these pulses are considered to be almost the same as the time integration value Li101 of Pulse P101. The angle width Wd100 of these pulses extends only across two measurement directions in the time charts, but may actually extend continuously across measurement directions that are not shown in the drawing.

On the other hand, in a dense fog condition, for example, Pulses P91 to P95 as shown in FIGS. 7(b) to 7(f) that correspond to substantially the same distance data appear over five adjacent measurement directions (from Angles N−2 to N+2, angle width: Wd90). Light diffusion/reflection level of dense fog itself is considered to be relatively low, but the time width is very long. Accordingly, for example, the time integration value Li93 of Pulse P93 is relatively high. Similarly, the time integration values of Pulses P91, P92, P94 and P95 corresponding to substantially the same distance in adjacent measurement directions are also relatively high. As for Pulse P106 generated by a raindrop, because the light reflection level is relatively low and the time width is short, the time integration value is very low.

Accordingly, in the data correcting portion of the fourth embodiment, the following correction may be performed.

For example, when the angle width such as Wd90 is not less than a predetermined angle width, the corresponding distance data may be removed. If the predetermined angle width includes, for example, four measurement directions, the distance data corresponding to Wd90 is removed, but the distance data corresponding to Wd80 and Wd100 remains.

Furthermore, when the angle width corresponding to particular distance information is not less than a predetermined angle width, and other distance information that includes at least one of a plurality of measurement directions included in that angle width as the corresponding angle width exists further away, the corresponding distance data may be removed. If the predetermined angle width includes, for example, four measurement directions, for example, Wd90 is not less than the predetermined angle. And, Wd80 that includes three measurement directions (from Angles N−1 to N+1) exists further away. Furthermore, Wd 100 that includes a single measurement direction (Angle N−2) other than these exists further away. Accordingly, the distance data corresponding to Wd90 is removed.

Furthermore, for example, when the average of the time integration values of the pulses within the range of Wd90 is greater than the average of the time integration values of the pulses within the range of Wd80 or Wd100 (or the average of all of them) by a predetermined amount or more, the distance data corresponding to Wd90 may be removed. In this case, simply, the averages may be compared. It is also possible to perform comparison based on whether or not the average is greater than a predetermined value or whether or not the average is greater than a predetermined ratio.

Furthermore, for example, when the Wd90 itself is not less than a predetermined angle width, the distance data corresponding to Wd90 may be removed.

Furthermore, some of the configurations described above may be combined and used to judge whether or not to remove the corresponding distance data.

According to the configuration of the fourth embodiment described above, because distance data with a possibility of being generated by part of pulsed laser light reflected, for example, not only by rain or snow but also by dense fog or the like that should not be used as a basis for human body judgment is removed in advance, an intruder or the like can be detected accurately not only in rainy or snowy conditions but also in dense fog conditions, and erroneous detection can be prevented to the highest degree possible.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. A laser area sensor, comprising:
   a first laser range finder that emits pulsed laser light, measures a period of time for light reflected by at least one object that is present in a laser light emitting direction to return thereby to obtain distance information to the object and light-reception level information of the reflected light;
   a scanning mechanism portion that changes a measurement direction of the first laser range finder;
   an information acquiring portion that defines a detection area and acquires distance information and light-reception level information in each measurement direction in the detection area in a time-series manner, by the first laser range finder periodically performing measurement while the scanning mechanism portion changes the measurement direction;
   a first information correcting portion that, if there is a discontinuous change exceeding a predetermined amount when the distance information and light-reception level information acquired by the information acquiring portion in each measurement direction are compared with distance information and light-reception level information of preceding and succeeding measurement periods of the measurement period, removes distance information corresponding to the discontinuous change in the measurement period in the measurement direction and corrects light-reception level information of a portion that does not correspond to the discontinuous change;
   a human body judging portion that extracts a portion that is presumed to correspond to a human body, from the distance information corrected by the first information correcting portion, and judges whether or not the extracted portion matches a human body based on a time-series moving status of the extracted portion; and
   a human body detection signal output portion that outputs a human body detection signal if the human body judging portion judges that a human body is present.

2. A laser area sensor, comprising:
   a first laser range finder that emits pulsed laser light, measures a period of time for light reflected by at least one object that is present in a laser light emitting direction to return thereby to obtain distance information to the object and light-reception level information of the reflected light;
   a scanning mechanism portion that changes a measurement direction of the first laser range finder;
   an information acquiring portion that defines a detection area and acquires distance information and light-reception level information in each measurement direction in the detection area in a time-series manner, by the first laser range finder periodically performing measurement while the scanning mechanism portion changes the measurement direction;
   an information correcting portion that, if there is a discontinuous change exceeding a predetermined amount when the distance information and light-reception level information acquired by the information acquiring portion in each measurement period are compared with distance information and light-reception level information of measurement directions adjacent to the measurement direction, removes distance information corresponding to the discontinuous change in the measurement direction in the measurement period;
   a human body judging portion that extracts a portion that is presumed to correspond to a human body, from the distance information corrected by the information correcting portion, and judges whether or not the extracted portion matches a human body based on a time-series moving status of the extracted portion; and
   a human body detection signal output portion that outputs a human body detection signal if the human body judging portion judges that a human body is present.

3. A laser area sensor, comprising:
   a first laser range finder that emits pulsed laser light, measures a period of time for light reflected by at least one object that is present in a laser light emitting direction to return thereby to obtain distance information to the object and light-reception level information of the reflected light;
   a scanning mechanism portion that changes a measurement direction of the first laser range finder;
   an information acquiring portion that defines a detection area and acquires distance information and light-reception level information in each measurement direction in the detection area in a time-series manner, by the first laser range finder periodically performing measurement while the scanning mechanism portion changes the measurement direction;
   a first information correcting portion that, if there is a discontinuous change exceeding a predetermined amount when the distance information and light-reception level information acquired by the information acquiring portion in each measurement direction are compared with distance information and light-reception level information of preceding and succeeding measurement periods of the measurement period, removes distance information corresponding to the discontinuous change in the measurement period in the measurement direction and corrects light-reception level information of a portion that does not correspond to the discontinuous change;

a second information correcting portion that, if there is a discontinuous change exceeding a predetermined amount when the distance information and light-reception level information acquired by the information acquiring portion in each measurement period are compared with distance information and light-reception level information of measurement directions adjacent to the measurement direction, removes distance information corresponding to the discontinuous change in the measurement direction in the measurement period;

a human body judging portion that extracts a portion that is presumed to correspond to a human body, from the distance information corrected by the first information correcting portion and the second information correcting portion, and judges whether or not the extracted portion matches a human body based on a time-series moving status of the extracted portion; and a human body detection signal output portion that outputs a human body detection signal if the human body judging portion judges that a human body is present.

4. A laser area sensor, comprising:

a laser range finder that emits pulsed laser light, measures a period of time for light reflected by at least one object that is present in a laser light emitting direction to return thereby to obtain distance information to the object and light-reception level information of the reflected light and time width information along the time axis of the reflected light;

a scanning mechanism portion that changes a measurement direction of the laser range finder;

an information acquiring portion that defines a detection area and acquires distance information, light-reception level information and time width information in each measurement direction in the detection area in a time-series manner, by the laser range finder periodically performing measurement while the scanning mechanism portion changes the measurement direction;

an information correcting portion that performs correction with a first information correcting function that, if there is a discontinuous change exceeding a predetermined amount when the distance information and light-reception level information acquired by the information acquiring portion in each measurement period are compared with distance information and light-reception level information of measurement directions adjacent to the measurement direction, removes distance information corresponding to the discontinuous change in the measurement direction in the measurement period, and with a second information correcting function that, when a measurement direction range in which an amount of change between adjacent measurement directions all falls within a predetermined range is referred to as a detection angle width when the distance information, light-reception level information and time width information acquired by the information acquiring portion in each measurement period are compared with distance information, light-reception level information and time width information of a plurality of measurement directions adjacent to the measurement direction, removes specific distance information if light-reception level information, time width information and detection angle width that correspond to the specific distance information in the measurement direction satisfies a predetermined relationship;

a human body judging portion that extracts a portion that is presumed to correspond to a human body, from the distance information corrected by the information correcting portion, and judges whether or not the extracted portion matches a human body based on a time-series moving status of the extracted portion; and a human body detection signal output portion that outputs a human body detection signal if the human body judging portion judges that a human body is present.

5. The laser area sensor according to claim 4, wherein the information correcting portion also performs correction with a third information correcting function that, if there is a discontinuous change exceeding a predetermined amount when the distance information and light-reception level information acquired by the information acquiring portion in each measurement direction are compared with distance information and light-reception level information of preceding and succeeding measurement periods of the measurement period, removes distance information corresponding to the discontinuous change in the measurement period in the measurement direction and corrects light-reception level information of a portion that does not correspond to the discontinuous change.

6. The laser area sensor according to claim 5, wherein the second information correcting function of the information correcting portion removes the specific distance information in the measurement direction in the measurement period if time width information corresponding to the specific distance information is not less than a predetermined time width.

7. The laser area sensor according to claim 5, wherein the second information correcting function of the information correcting portion removes the specific distance information in the measurement direction in the measurement period if a detection angle width corresponding to the specific distance information is not less than a predetermined angle width.

8. The laser area sensor according to claim 5, wherein the second information correcting function of the information correcting portion removes the specific distance information in the measurement direction in the measurement period if time width information corresponding to the specific distance information is not less than a predetermined time width and a detection angle width corresponding to the specific distance information is not less than a predetermined angle width.

9. The laser area sensor according to claim 5, wherein the second information correcting function of the information correcting portion removes the specific distance information in the measurement direction in the measurement period if the ratio between time width information corresponding to the specific distance information and detection angle width corresponding to the specific distance information is not less than a predetermined ratio.

10. The laser area sensor according to claim 4, wherein the second information correcting function of the information correcting portion removes the specific distance information in the measurement direction in the measurement period if time width information corresponding to the specific distance information is not less than a predetermined time width.

11. The laser area sensor according to claim 10, wherein the second information correcting function of the information correcting portion removes the specific distance information in the measurement direction in the measurement period only when the average of light-reception level information in the detection angle width corresponding to the specific distance information is not greater than a predetermined value.

12. The laser area sensor according to claim 4, wherein the second information correcting function of the information correcting portion removes the specific distance information in the measurement direction in the measurement period if a detection angle width corresponding to the specific distance information is not less than a predetermined angle width.

13. The laser area sensor according to claim 4, wherein the second information correcting function of the information correcting portion removes the specific distance information in the measurement direction in the measurement period if time width information corresponding to the specific distance information is not less than a predetermined time width and a detection angle width corresponding to the specific distance information is not less than a predetermined angle width.

14. The laser area sensor according to claim 4, wherein the second information correcting function of the information correcting portion removes the specific distance information in the measurement direction in the measurement period if the ratio between time width information corresponding to the specific distance information and detection angle width corresponding to the specific distance information is not less than a predetermined ratio.

15. A laser area sensor, comprising:
a laser range finder that emits pulsed laser light, measures a period of time for light reflected by at least one object that is present in a laser light emitting direction to return thereby to obtain distance information to the object and light-reception level time integration information in which the light-reception level of the reflected light is time-integrated;
a scanning mechanism portion that changes a measurement direction of the laser range finder;
an information acquiring portion that defines a detection area and acquires distance information and light-reception level time integration information in each measurement direction in the detection area in a time-series manner, by the laser range finder periodically performing measurement while the scanning mechanism portion changes the measurement direction;
an information correcting portion that, when a measurement direction range in which an amount of change between adjacent measurement directions all falls within a predetermined range is referred to as a detection angle width when the distance information and light-reception level time integration information acquired by the information acquiring portion in each measurement period are compared with distance information and light-reception level time integration information of a plurality of measurement directions adjacent to the measurement direction, removes first distance information of the measurement period if first light-reception level time integration information and a first detection angle width that correspond to the first distance information of the measurement direction satisfies a predetermined relationship;
a human body judging portion that extracts a portion that is presumed to correspond to a human body, from the distance information corrected by the information correcting portion, and judges whether or not the extracted portion matches a human body based on a time-series moving status of the extracted portion; and
a human body detection signal output portion that outputs a human body detection signal if the human body judging portion judges that a human body is present.

16. The laser area sensor according to claim 15, wherein the information correcting portion removes the first distance information of the measurement period if the first detection angle width is not less than a predetermined angle width.

17. The laser area sensor according to claim 15, wherein the information correcting portion removes the first distance information of the measurement period if the first detection angle width is not less than a predetermined angle width and other distance information that includes at least one of a plurality of measurement directions included in the first detection angle width as a corresponding detection angle width exists further away.

18. The laser area sensor according to claim 15, wherein the information correcting portion removes the first distance information of the measurement period if a first average of the first detection angle width of the first light-reception level time integration information is greater than an average of respective detection angle widths or an average of all detection angle widths of light-reception level time integration information corresponding to other distance information that includes at least one of a plurality of measurement directions included in the first detection angle width as a corresponding detection angle width by a predetermined amount or more.

19. The laser area sensor according to claim 15, wherein the information correcting portion removes the first distance information of the measurement period if the first detection angle width is greater than respective detection angle widths corresponding to other distance information that includes at least one of a plurality of measurement directions included in the first detection angle width as a corresponding detection angle width by a predetermined amount or more.

20. The laser area sensor according to claim 15, wherein the information correcting portion removes the first distance information of the measurement period if a first average of the first detection angle width of the first light-reception level time integration information is greater than an average of respective detection angle widths or an average of all detection angle widths of light-reception level time integration information corresponding to other distance information that includes at least one of a plurality of measurement directions included in the first detection angle width as a corresponding detection angle width by a predetermined amount or more, and the first detection angle width is greater than respective detection angle widths corresponding to other distance information that includes at least one of a plurality of measurement directions included in the first detection angle width as a corresponding detection angle width by a predetermined amount or more.

* * * * *